United States Patent [19]

Grieb

[11] Patent Number: 5,165,227
[45] Date of Patent: Nov. 24, 1992

[54] PROPELLING NOZZLE FOR A HYPERSONIC ENGINE

[75] Inventor: Hubert Grieb, Germering, Fed. Rep. of Germany

[73] Assignee: MTU Motoren- und Turbinen-Union Munchen GmbH, Fed. Rep. of Germany

[21] Appl. No.: 683,709

[22] Filed: Apr. 11, 1991

[30] Foreign Application Priority Data

Apr. 14, 1990 [DE] Fed. Rep. of Germany ....... 4012212

[51] Int. Cl.$^5$ ............................................. F02K 1/00
[52] U.S. Cl. ..................................... 60/226.1; 60/271;
60/262; 239/127.1; 239/127.3; 239/265.17; 239/265.19
[58] Field of Search ............ 60/226.1, 262, 271; 239/127.1, 127.3, 265.17, 265.19

[56] References Cited

U.S. PATENT DOCUMENTS

| | | | |
|---|---|---|---|
| 2,570,629 | 10/1951 | Anxionnaz et al. | 60/271 |
| 3,149,460 | 9/1964 | La Rocca | 60/271 |
| 3,149,461 | 9/1964 | Eichholtz | 60/271 |
| 3,303,654 | 2/1967 | Bringer | 239/127.3 |
| 3,841,091 | 10/1974 | Sargisson et al. | 60/271 |
| 4,068,469 | 1/1978 | Adamson | 60/271 |
| 4,527,388 | 7/1985 | Wallace, Jr. | 60/271 |

FOREIGN PATENT DOCUMENTS

| | | |
|---|---|---|
| 2321300 | 11/1973 | Fed. Rep. of Germany . |
| 3912330 | 10/1990 | Fed. Rep. of Germany . |
| 1417504 | 12/1975 | United Kingdom . |
| 2132279 | 7/1984 | United Kingdom . |

Primary Examiner—Richard A. Bertsch
Assistant Examiner—Howard R. Richman
Attorney, Agent, or Firm—Evenson, Wands, Edwards, Lenahan & McKeown

[57] ABSTRACT

A nozzle for a hypersonic engine includes an axially displaceable mushroom-shaped central body. Two mutually opposing expansion flaps are provided which, when the flying Mach number is low, can be swivelled with respect to one another and, when the flying Mach number is high, can be swivelled apart. As a result, an extensive change of the divergence of the nozzle can be achieved while maintaining a high mechanical stiffness and a low leakage level.

16 Claims, 4 Drawing Sheets

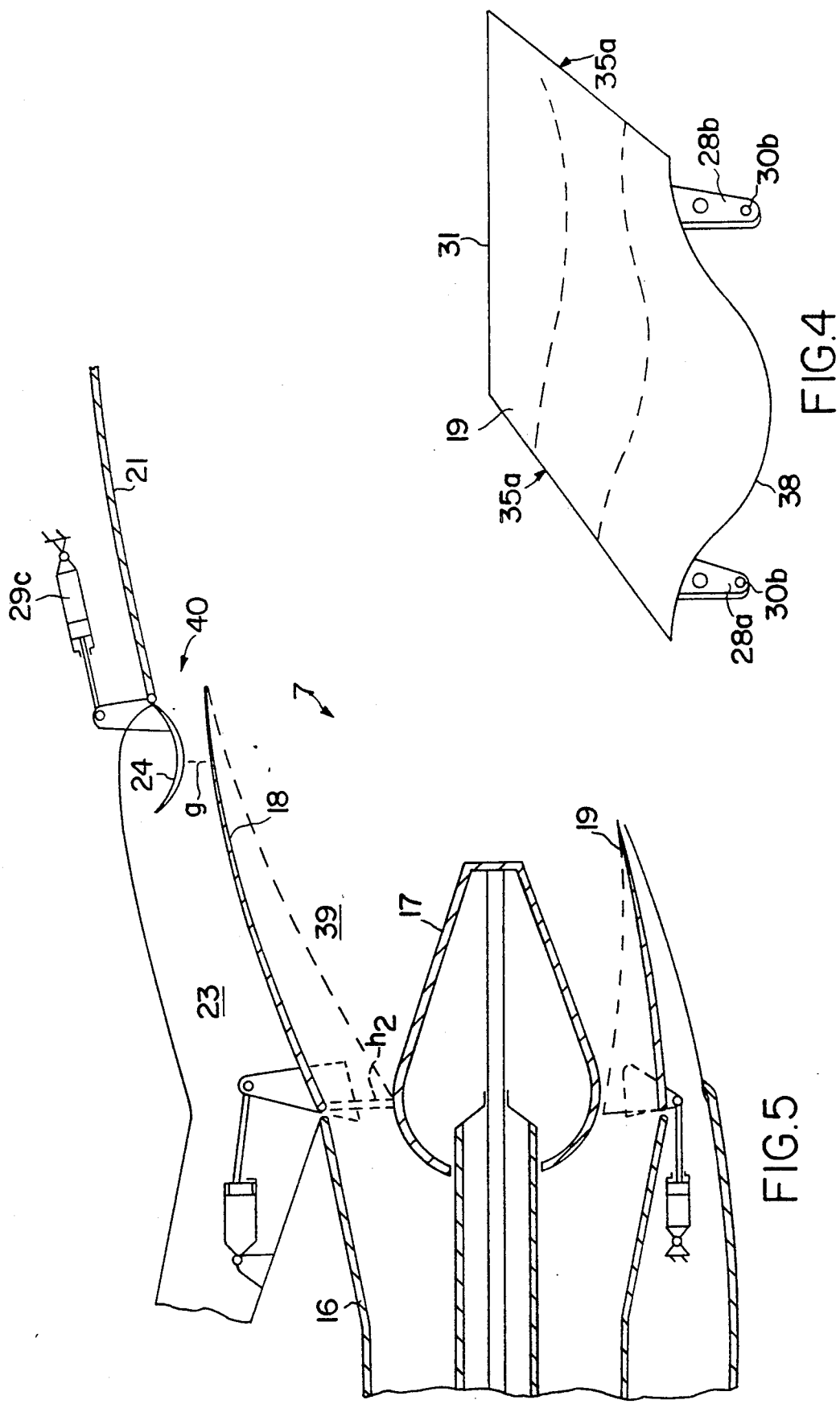

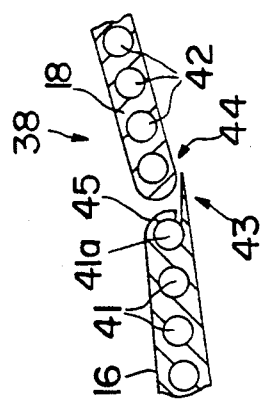
FIG.6
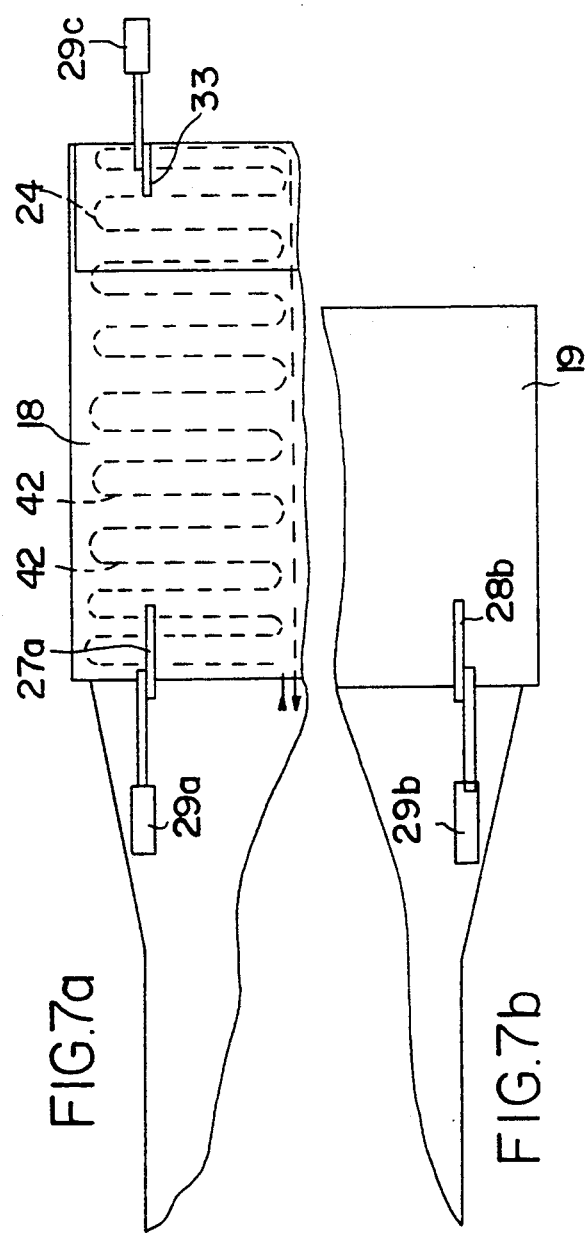
FIG.7a
FIG.7b

5,165,227

PROPELLING NOZZLE FOR A HYPERSONIC ENGINE

BACKGROUND AND SUMMARY OF THE INVENTION

This invention relates to a propelling nozzle for a hypersonic engine and, more particularly to a propelling nozzle which includes a mushroom-shaped central body axially displaceable for changing the nozzle throat area. The outer wall of the propelling nozzle behind the nozzle throat area, transitions into increasedly widening sectional planes of an expanding circle.

A difficult requirement to meet for hypersonic engines that are appropriate for flying speeds between Mach 0 to Mach 7 is that a high conversion of exhaust gas energy into the gross thrust, or jet thrust, needs to take place at both low flying speeds below Mach 1 as well as at high speeds of Mach 7.

For this purpose, it has been suggested to provide combined turboramjet engines which, at low flying speeds, operate as gas turbojet engines with or without an afterburner and, above a certain flying speed, operate as ramjet engines, i.e., RAM-operation.

The nozzles of hypersonic engines are significantly different from conventional nozzle concepts. This is because of the much larger variation range of the decisive parameters. Particularly, the nozzle throat area must be varied at a ratio of 1:5. Further, the existing nozzle pressure ratio, which during operation rises from approximately 3 during take-off to a magnitude of 1,000 at hypersonic flight Mach number 7, thus in principle requires an enormously high variation range of the divergence.

The extremely high divergence is required at hypersonic flight Mach numbers because of the existing high nozzle pressure ratios, i.e., the ratio of the exhaust surface to the nozzle throat surface. The extremely high divergence cannot be implemented inside the nozzle. Therefore, in any case, an afterexpansion path is required which follows the nozzle and is created by the corresponding design of the airplane rear.

The known axially symmetrical convergent/divergent nozzles having a lamellar construction, as used, for example, in military afterburner engines, have a variation range of the nozzle throat area and the divergence which is much too small. Therefore, this type of nozzle cannot be used for the engines of the above-mentioned type.

In addition, convergent, axially symmetrical nozzles with axially displaceable central bodies are known where the throat surface can be adjusted within a wide range. So far, nozzles of this type have been used only in cases with three engines without any afterburning. This is because the cooling of the central body by air taken, for example, from the turbo-engine, presents problems.

Another nozzle construction known, for example, from German Patent Application P 39 12 330 is called a two-dimensional nozzle. Although this construction permits a large variation range of the throat area and of the divergence, the construction of such a nozzle is very expensive and results in a high weight.

All known concepts for axially symmetrical and two-dimensional nozzles that are taken into consideration for hypersonic application are each supplemented by afterexpansion paths which are formed by the airplane rear contour. The afterexpansion paths are used for supplementing the divergent nozzle section in such a manner that the expansion of the thrust jet, at least on the upper side, is guided through a fixed wall.

There is therefore needed a nozzle for a hypersonic engine of this type which, on the one hand, permits a high nozzle divergence, and, on the other hand however, also has sufficient inherent stability and low leakages. In addition, it should be possible to vectorize the jet upward or downward while maintaining the desired divergence by means of a targeted adjustment.

According to the invention, this need is met by a propelling nozzle having a variable geometry for a hypersonic engine. The propelling nozzle has a mushroom-shaped central body which can be displaced for changing the narrowest nozzle cross-section with respect to an outer wall. The outer wall widens at one point in the direction of the nozzle outlet in which two opposite areas of the widening outer wall are constructed as expansion flaps. In the area of the expansion flaps upward edges, the flaps can be pivoted transversely with respect to the engine axis about pivots parallel to one another.

The principal advantages of the present invention are that a substantial rotationally symmetrical structure and a thermal and mechanical stressing of the actual nozzle shroud exist in the forward nozzle part. This is particularly advantageous with respect to the stiffness.

The same applies to the displaceable mushroom-shaped central body. Because of the rotationally symmetrical contour, the thermal and mechanical stressing of the mushroom-shaped central body is also rotationally symmetrical and can therefore be absorbed in an advantageous manner.

A high variation range of the nozzle throat area is achieved by the axial displacement of the central body. The central body's adjusting mechanism is situated inside the structure cooled by cryogenic hydrogen.

Advantageously, leakages of the type that are unavoidable in the case of two-dimensional nozzles can be avoided up to the area of the upstream edges of the expansion flaps. However, at high supersonic flight Mach numbers or high internal pressures, this area is already in the supersonic range where, because of the preceding expansion or because of the low static pressures in the nozzle, the leakages are less in comparison to the subsonic range.

Another significant advantage of the present invention is that the upper expansion flap together with the lower expansion flap may be used for vectorizing the jet upward or downward while maintaining the desired divergence by means of a targeted adjustment. In this case, in the lower Mach number range in which the upper expansion flap is moved out anyhow, larger vectorization angles may advantageously be set by means of the adjusting of both flaps. In the upper Mach number range, smaller vectorization angles can be achieved by the adjustment of the lower expansion flap. The upper expansion flap remains in its upper end position.

It is also an advantage that the mechanical stressing of moments of the expansion flaps about their respective axis of rotation is low because of the pressure level which decreases in the hypersonic flow.

Other objects, advantages and novel features of the present invention will become apparent from the following detailed description of the invention when considered in conjunction with the accompanying drawings.

BRIEF DESCRIPTION OF THE DRAWINGS

FIG. 4 is a diagonal view of the lower expansion flap;

FIG. 5 is a view of the nozzle with the central body in the "rearward" position for the turbo operation in the range up to Mach 3;

FIG. 6 is a longitudinal sectional view of the transition from the outer wall to the expansion flap;

FIG. 7a is a top view of the upper expansion flap; and

FIG. 7b is a bottom view of the lower expansion flap.

DETAILED DESCRIPTION OF THE DRAWINGS

Figure 1:
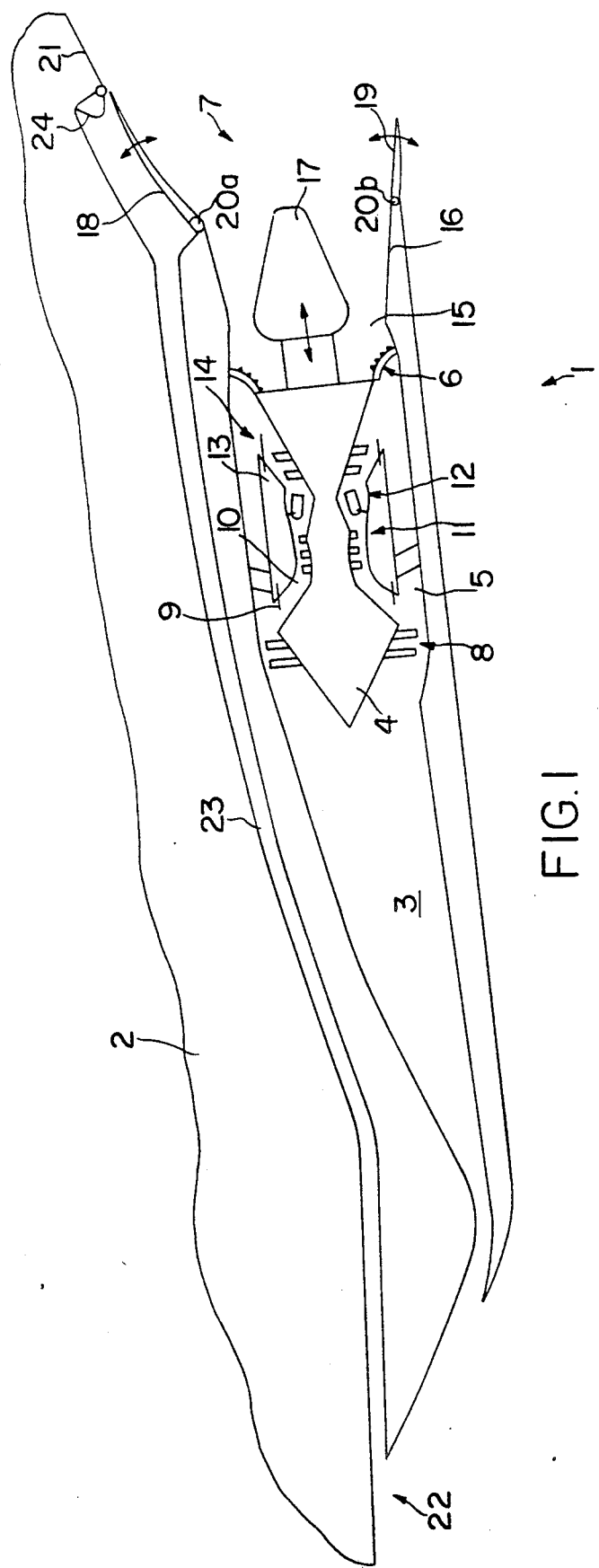
FIG. 1 is a schematic longitudinal sectional view of a hypersonic turbo engine, with the central body in the "forward" position for "hypersonic" operation.

FIG. 1 is an axial sectional view of a hypersonic engine 1 which is mounted on the bottom to a hypersonic airplane 2 which is not shown. The hypersonic engine 1 essentially comprises an air intake 3, a turbo engine 4 situated on the inside, a ramjet engine consisting of a ram air duct 5 and injection devices 6, and a nozzle 7.

The turbo engine 4 comprises a two-stage fan 8 which, during the ramjet operation can be moved in the feathered pitch; a turbo intake duct 10 which can be closed off by a first ring slide 9; a high-pressure compressor 11; a combustion chamber 12; a turbine 13; and a second ring slide 14 which can close off the turbo engine on the rear.

During the turbo operation, the air flow arriving in the air intake 3 is compressed by means of the fan 8. One part flows into the turbo intake duct 10 where the air is compressed by means of the high-pressure compressor 11. The air is burnt in the combustion chamber 12 together with kerosene or with fed cryogenically stored hydrogen, and subsequently acts upon the turbine 13. Behind the turbine 13, the gas flow is admixed to the other air current (turbofan) which flows past through the ram air duct 5 and together with it, after passing through the injection devices 6, arrives in a second combustion chamber 15. During the turbo operation, this second combustion chamber 15 is also used as an afterburner operated by means of hydrogen, similar to the case of conventional turbo engines equipped with afterburners.

The nozzle 7 is arranged behind the second combustion chamber 15. The nozzle 7 essentially comprises a convergently/divergently extending ring-shaped outside wall 16 and an axially displaceable mushroom-shaped central body 17. The nozzle throat area, as the narrowest cross-section between the outer wall 16 and the central body 17, is a function of the axial position of the central body 17, and is shown in detail in FIG. 2.

During the ramjet operation, the first ring slide 9 and the second ring slide 14 are in their closed position which closes off the turbo engine 4 or its air intake 10. In this case, the complete air current arriving in the air intake 3 flows into the second combustion chamber 15 after passing through the fan 8 switched to a feathered pitch and through the ram air duct 5. By means of the injection devices 6, fuel is admixed, the combustion taking place solely in the second combustion chamber 15.

Downstream of the ring-shaped outer wall 16, two expansion flaps 18 and 19 are provided which are part of the nozzle 7 and which can be pivoted about pivots 20a, 20b transversely to the engine axis. The first or top expansion flap 18 adapts to the nozzle contour on the side facing the airplane. In a flow-supporting manner, the top expansion flap 18 transitions into an airplane shell 21 and, together with it, defines the continuation of the nozzle wall.

Upstream of the air intake 3, an opening 22 is provided between the hypersonic airplane 2 and the hypersonic engine 1. The opening 22 is used for suctioning off the fuselage boundary layer. A boundary layer duct 23 connects to the opening 22 and extends into the area of the first expansion flap 18. When the first expansion flap 18 is swivelled downward, the boundary layer duct 23 is therefore opened toward the rear and is otherwise closed. Another boundary layer flap 24, which will be described in the following figures, is also provided and, together with the first expansion flap 18, is used as the required free cross-section for the blowing in of the air from the fuselage boundary layer into the exhaust gas flow.

Figure 2:
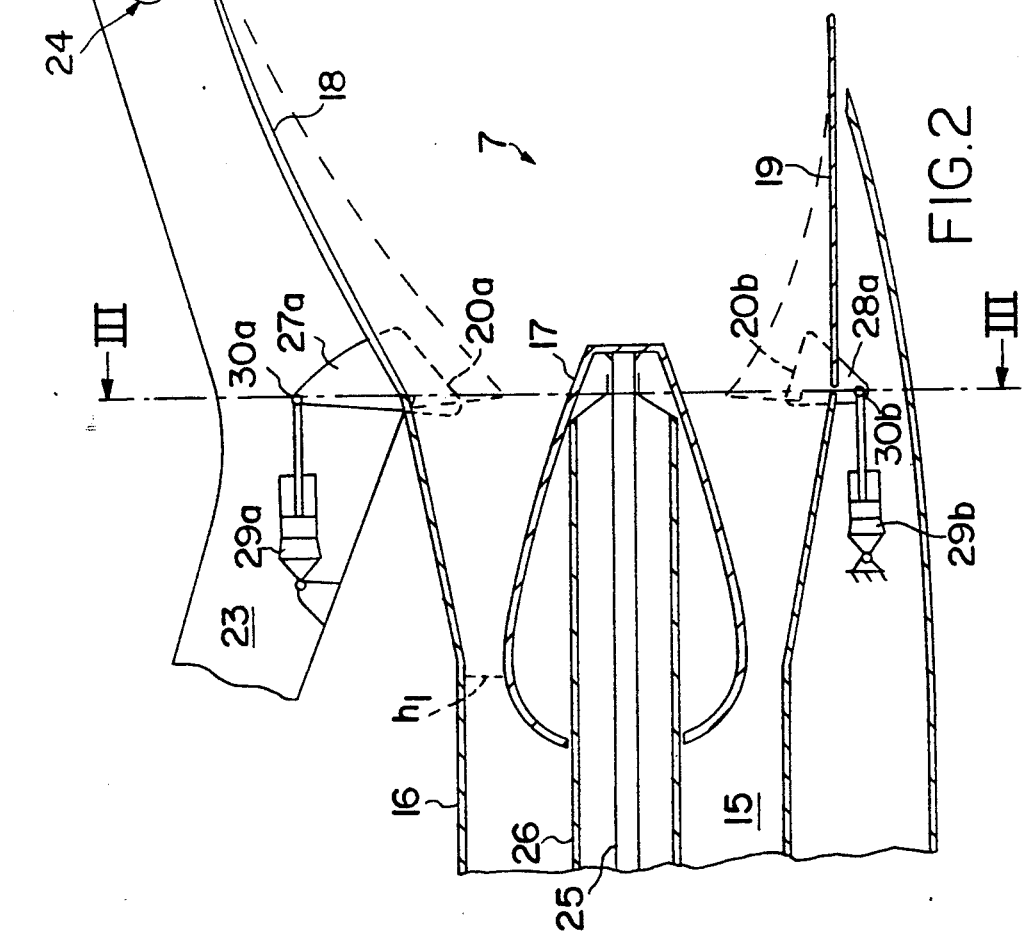
FIG. 2 is a longitudinal sectional view of the nozzle area of the engine according to FIG. 1 at a high Mach number.

FIG. 2 shows an enlarged cutout of the nozzle 7 in an axial sectional view. All areas which are hatched in this figure and in the other figures are provided with coolant ducts through which cryogenic fuel, particularly hydrogen, flows for the purpose of removing the high occurring heat.

FIG. 2 illustrates the nozzle in a position as it exists at high Mach numbers, particularly possibly in the range of higher than Mach 4. The central body 17, by means of its connecting rod 25 and by way of the holding cylinder 26, has moved into its forward end position so that the nozzle throat surface $h_1$ is defined between the largest circumference of the central body 17 and the opposite area of the ring-shaped outer wall 16.

Figure 3:
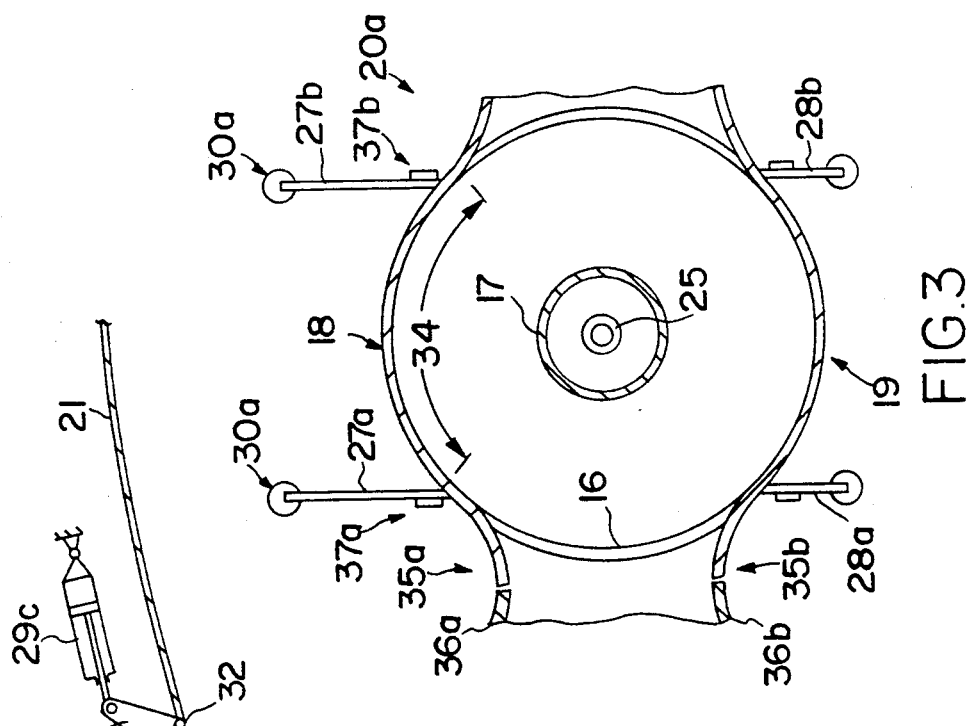
FIG. 3 is a cross-sectional view of the nozzle along Line III—III according to FIG. 2.

Downstream of this nozzle throat area $h_1$, which is as narrow as possible, the outer wall 16 widens in a conical or bell-shaped manner and ends in the area of the cross-sectional line III—III indicated by an interrupted line. The two expansion flaps 18 and 19 start there above and below the central body 17 on two opposite circumferential sections. The two expansion flaps 18 and 19 are constructed to be pivotable about the pivots 20a and 20b. Holding flanges 27a, 27b and 28a, 28b are molded onto the expansion flaps 18 and 19 (FIG. 3). On the one hand, they are used for the pivotable bearing in the lateral axes 20a and 20b and, on the other hand, for the introduction of the adjusting moments. For this purpose, adjusting arrangements 29a and 29b are provided which are supported on the engine casing. On the hinge points 30a and 30b, the adjusting arrangements 29a and 29b are connected with the holding flanges 27a, 27b and 28a, 28b. Downstream of the first expansion flap 18, the airplane shell 21 is also connected.

In the area of the downstream edge 31 of the upper expansion flap 18, a swivelling shaft 32 is stationarily provided about which a boundary layer flap 24, which is crescent-shaped in the sectional view, can be pivoted. This boundary layer flap 24 can be swivelled in and out by way of the swivel flanges or flanges 33 by means of the adjusting arrangement 29c. In the shown operating position for high Mach numbers, this boundary layer flap 24, however, has no significance because the upper expansion flap 18 closes off the boundary layer duct 23.

FIG. 3 is a cross-sectional view along Line III—III according to FIG. 2, in which the cross-sectional contours of the two expansion flaps 18 and 19 are visible. The two expansion flaps 18 and 19 have a cross-section which may possibly be called wavy or curved, i.e., there is a circular cross-sectional contour in a central area 34, in which case, oppositely curved arched areas connect to both sides of this area 34. In the area of their outer edges 35a and 35b, a transition takes place to the expansion flaps 36a and 36b of the adjacent engine.

The two holding flanges 27a and 27b are fastened on the upper expansion flap 18 and are used for the bearing of the expansion flap 18 in bearings devices 37a and 37b so that the expansion flap 18 can be pivoted about the pivot 20a. At the same time, the adjusting arrangements 29a shown in FIG. 2 are then pivotally connected to the holding flanges 27a and 27b at the hinge points 30a. The lower expansion flap 19 is pivotally disposed and connected in the same manner.

FIG. 4 is a diagonal perspective view of the lower expansion flap 19, the transition from the wavy contour at the upstream edge 38 to the straight contour in the area of the downstream edge 31 being recognizable. The upper expansion flap 18 has an analogous shape with the exception that it has a larger dimension in the axial direction of the engine. This shaping is important with respect to the stiffness of the flaps.

FIG. 5 shows the nozzle 7 according to FIG. 2 in its operating position for low Mach numbers in the range of the turbo operation. In contrast to the high-speed position shown in FIG. 2, in this case, the central body 17 is in its axially rearward end position while the two expansion flaps 18 and 19 are swivelled toward the inside.

In the shown operating position, the largest possible nozzle throat area $h_2$ is fixed between the largest circumference of the central body 17 and the end of the ring-shaped outer wall 16. At the same time, because the expansion flaps 18 and 19 are swivelled toward the inside, a smaller widening of the nozzle duct 39 takes place resulting in a significantly lower divergence of the nozzle 7 in this operating position.

After the upper expansion flap 18 is swivelled downward, a gap 40 opens up between it and the airplane shell 21 situated downstream through which the boundary layer duct 23 is connected with the nozzle duct 39. As a result, the boundary layer flow is admixed to the exhaust gas flow of the hypersonic engine 1. When the expansion flap 18 is open, the boundary layer flap 24, by means of the third adjusting arrangement 29, is adjusted in such a manner that the required nozzle cross-section g can be maintained between the boundary layer flap 24 and the upper expansion flap 18. The mounting of this flap, which is not subjected to the hot gas jet but only to the fuselage boundary layer, is particularly constructively advantageous on this point because the contour of the afterexpansion path defined by the airplane shell 21 is straight vertically to the flow.

FIG. 6 is a sectional view of an enlarged cutout of the transition from the outer wall 16 to the upper expansion flap 18. It is shown in this case how the outer wall 16 as well as the upper expansion flap 18 is penetrated by cooling air ducts 41 and 42 through which cryogenic fuel flows for the purpose of cooling these structural members. A sealing lip 43 is molded onto the outer wall 16 so that only a narrow gap 44 remains between it and the upper expansion flap 18. The rearmost cooling air duct 41a of the outer wall 16 is provided with one or several outlets 45 through which a smaller amount of fuel flows from the rearward cooling air duct 41a through the gap 44. As a result, the sealing lip 43 is cooled sufficiently. With respect to the amount, the escaping fuel is very low and, because of its expansion, also participates in the cyclic process. The gap between the outer wall 16 of the nozzle and flap 19 is designed in the same manner.

FIG. 7a is a top view of a part of the upper expansion flap 18 as well as of the boundary layer flap 24. By means of an interrupted line, the meandering course of the cooling ducts 42 is shown in one half of the flap. Analogously, FIG. 7b is a bottom view of the lower expansion flap 19, which shows that it is shorter than the upper expansion flap 18. By means of flexible lines, which are not shown, the cooling ducts 42 are coupled with the cooling ducts of the rigid structural members.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A propelling nozzle, having a nozzle configuration, of an aircraft engine, having an engine axis, for an aircraft operated in subsonic, supersonic, or hypersonic flight comprising:
    an outer wall having a flap-type adjustable wall area at a downstream end;
    a mushroom-shaped central body located coaxially within said outer wall and being axially displaceable relative to said outer wall for changing the nozzle configuration and a narrowest nozzle cross-section formed between the outer wall and the central body;
    wherein said outer wall conically expands from the narrowest nozzle cross-section towards the downstream end;
    wherein said flap-type adjustable wall area comprises expansion flaps connected to the downstream end of the expanded outer wall, said expansion flaps including an upper expansion flap and a lower expansion flap arranged oppositely above one another;
    at least two pivots mounted parallel to one another, wherein each of said expansion flaps at an upstream edge is transversely pivotable with respect to the engine axis about one of said pivots;
    means for pivotally moving said expansion flaps either simultaneously or independently of one another;
    wherein an end contour of said upper expansion flap is adjusted in a flow-promoting manner to a fuselage contour of the aircraft; and
    wherein the aircraft engine is a combined turboramjet engine.

2. A propelling nozzle according to claim 1, wherein the expansion flaps have a curved portion at an upstream edge to adapt to the outer wall of the propelling nozzle, said curved portion decreasing in a downstream direction to a straight end edge.

3. A propelling nozzle according to claim 1, wherein the pivots are essentially arranged on an axial coordinate of a largest circumference of said mushroom-shaped central body when situated in its rearward end position.

4. A propelling nozzle according to claim 1, wherein a first of said expansion flaps, in a first position, closes off a boundary layer duct and, in a second position, connects the boundary layer duct with an expansion path of the nozzle.

5. A propelling nozzle according to claim 1, wherein said pivots are located closer to the engine axis than is the outer wall at its closest position to the engine axis.

6. A propelling nozzle according to claim 3, wherein said pivots are located closer to the engine axis than is the outer wall at its closest position to the engine axis.

7. A propelling nozzle according to claim 1, further comprising:
    sealing lips molded onto said outer wall for sealing gaps between said outer wall and said expansion flaps;
    wherein said outer wall includes outlets for feeding cryogenic fuel for said sealing lips, said cryogenic fuel flowing past said sealing lips on their downstream sides;
    a residual gap formed between said sealing lips and expansion flaps wherein said cryogenic fuel flows through said residual gap into an expansion path of the nozzle.

8. A propelling nozzle according to claim 4, further comprising a boundary layer flap operatively arranged in said boundary layer duct and interacting with the rear of the first expansion flap, said boundary layer flap being adjustable to a boundary layer flow cross-section.

9. A propelling nozzle according to claim 8, further comprising a third pivot arranged in the area of the downstream edge of the first expansion flap, the boundary layer flap being pivoted about the third pivot.

10. A propelling nozzle according to claim 9, wherein the boundary layer flap extends from the third pivot in the upstream direction.

11. A propelling nozzle according to claim 8, wherein the boundary layer flap is crescent-shaped in its sectional view.

12. A propelling nozzle according to claim 1, wherein said engine is for flying aggregates and can be used in subsonic, supersonic and hypersonic flying operation, and further wherein the respectively narrowest nozzle cross-section is developed as a function of the axial position of said central body which is divergent/convergent in the flow direction, between its largest outside diameter and said outer wall.

13. A propelling nozzle according to claim 6, wherein said engine is for flying aggregates and can be used in subsonic, supersonic and hypersonic flying operation, and further wherein the respectively narrowest nozzle cross-section is developed as a function of the axial position of said central body which is divergent/convergent in the flow direction, between its largest outside diameter and said outer wall.

14. A propelling nozzle according to claim 7, wherein said engine is for flying aggregates and can be used in subsonic, supersonic and hypersonic flying operation, and further wherein the respectively narrowest nozzle cross-section is developed as a function of the axial position of said central body which is divergent/convergent in the flow direction, between its largest outside diameter and said outer wall.

15. A propelling nozzle according to claim 10, wherein said engine is for flying aggregates and can be used in subsonic, supersonic and hypersonic flying operation, and further wherein the respectively narrowest nozzle cross-section is developed as a function of the axial position of said central body which is divergent/convergent in the flow direction, between its largest outside diameter and said outer wall.

16. A propelling nozzle according to claim 1, wherein said outer wall has an inside contour extending convergently/divergently in the flow direction, said narrowest cross-section between the starting and end position of the widening of the outer wall viewed in the axial direction being variably adjustable by said central body.

* * * * *